United States Patent
Hashimoto et al.

(10) Patent No.: US 10,926,739 B2
(45) Date of Patent: Feb. 23, 2021

(54) WIRELESS COMMUNICATION SYSTEM

(71) Applicant: ASAHI DENSO CO., LTD., Hamamatsu (JP)

(72) Inventors: Shigeki Hashimoto, Hamamatsu (JP); Keita Takeuchi, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 80 days.

(21) Appl. No.: 16/156,120

(22) Filed: Oct. 10, 2018

(65) Prior Publication Data

US 2019/0110200 A1   Apr. 11, 2019

(30) Foreign Application Priority Data

Oct. 11, 2017  (JP) ............................. JP2017-197431
Sep. 3, 2018   (JP) ............................. JP2018-164396

(51) Int. Cl.
*B60R 25/24* (2013.01)
*H04W 12/06* (2021.01)
(Continued)

(52) U.S. Cl.
CPC ............ *B60R 25/241* (2013.01); *B60R 25/24* (2013.01); *B60R 25/246* (2013.01);
(Continued)

(58) Field of Classification Search
CPC ..... B60R 25/241; B60R 25/246; B60R 25/24; B60R 25/248; G07C 9/00309;
(Continued)

(56) References Cited

U.S. PATENT DOCUMENTS 5,467,070 A * 11/1995 Drori et al. ............. B60R 25/24
                                                       340/426.36
7,042,332 B2 * 5/2006 Takamura et al. ...... B60R 25/24
                                                         340/5.24
(Continued)

FOREIGN PATENT DOCUMENTS

EP    3 121 069 A1    1/2017
EP    3 318 704 A1    5/2018
(Continued)

OTHER PUBLICATIONS

Extended European Search Report issued in Patent Application No. EP 18 19 9759.4 dated Feb. 13, 2019.

*Primary Examiner* — Dale W Hilgendorf
(74) *Attorney, Agent, or Firm* — Pearne & Gordon LLP

(57) ABSTRACT

A wireless communication system includes: an in-vehicle unit mounted on a vehicle and capable of wirelessly transmitting an access signal when an operation unit is operated; a portable device capable of wirelessly transmitting a vehicle-specific authentication code on a condition that the access signal is received; and a determination unit capable of determining whether or not the authentication code is a regular authentication code on a condition that the authentication code is received. Start of a driving source of the vehicle is permitted or running of the vehicle is enabled when the determination unit determines that the authentication code is the regular authentication code, and a security mode in which a function of transmitting the access signal by the in-vehicle unit or a function of transmitting the authentication code by the portable device is stopped can be set by a predetermined setting operation.

17 Claims, 8 Drawing Sheets

(51) Int. Cl.
*H04B 1/3822* (2015.01)
*G07C 9/00* (2020.01)

(52) U.S. Cl.
CPC ........ *B60R 25/248* (2013.01); *G07C 9/00174* (2013.01); *G07C 9/00309* (2013.01); *H04B 1/3822* (2013.01); *H04W 12/06* (2013.01); *G07C 2009/005* (2013.01); *G07C 2009/0042* (2013.01); *G07C 2009/00507* (2013.01); *G07C 2009/00531* (2013.01); *G07C 2009/00539* (2013.01); *G07C 2009/00547* (2013.01); *G07C 2009/00555* (2013.01); *G07C 2009/00769* (2013.01); *H04L 2209/84* (2013.01)

(58) Field of Classification Search
CPC ...... G07C 9/00174; G07C 2009/00507; G07C 2009/005; G07C 2009/00539; G07C 2009/0042; G07C 2009/00531; G07C 2009/00547; G07C 2009/00555; G07C 2009/00769; H04W 12/06; H04B 1/3822; H04L 2209/84
See application file for complete search history.

(56) References Cited

U.S. PATENT DOCUMENTS

| | | | |
|---|---|---|---|
| 7,224,980 B2 * | 5/2007 | Hara | B60R 25/24 |
| | | | 455/456.1 |
| 8,164,417 B2 * | 4/2012 | Yamamoto et al. | |
| | | | B60R 25/245 |
| | | | 340/5.61 |
| 9,809,196 B1 * | 11/2017 | Penilla et al. | B60R 25/24 |
| 9,919,680 B2 * | 3/2018 | Miyazawa | B60R 25/24 |
| 2004/0242201 A1 * | 12/2004 | Sasakura et al. | H04W 12/06 |
| | | | 455/411 |
| 2006/0012462 A1 * | 1/2006 | Teshima et al. | B60R 25/24 |
| | | | 340/5.61 |
| 2009/0043457 A1 * | 2/2009 | Shibagaki et al. | |
| | | | G07C 9/00309 |
| | | | 340/5.64 |
| 2010/0071427 A1 * | 3/2010 | Tsuruta | B60R 25/241 |
| | | | 70/237 |
| 2010/0090817 A1 * | 4/2010 | Yamaguchi et al. | |
| | | | G07C 9/00309 |
| | | | 340/438 |
| 2012/0310447 A1 * | 12/2012 | Toki | B60R 25/24 |
| | | | 701/2 |
| 2014/0316610 A1 * | 10/2014 | Tomita et al. | B60R 25/24 |
| | | | 701/2 |
| 2014/0324250 A1 * | 10/2014 | Tomita et al. | B60R 25/24 |
| | | | 701/2 |
| 2015/0179008 A1 * | 6/2015 | Sung et al. | G07C 2009/00769 |
| | | | 340/5.61 |
| 2016/0012653 A1 * | 1/2016 | Soroko | G07C 9/00309 |
| | | | 340/5.61 |
| 2017/0021803 A1 | 1/2017 | Lohmann | |
| 2017/0300721 A1 * | 10/2017 | Blaser et al. | B60R 25/24 |
| 2018/0015905 A1 * | 1/2018 | Yorke et al. | B60R 25/24 |
| 2018/0170313 A1 * | 6/2018 | Iwashita | B60R 25/246 |

FOREIGN PATENT DOCUMENTS

| | | |
|---|---|---|
| JP | 2016-220088 A | 12/2016 |
| KR | 10-1734947 B1 | 5/2017 |

* cited by examiner

WIRELESS COMMUNICATION SYSTEM

CROSS-REFERENCE TO RELATED APPLICATION(S)

This application is based upon and claims the benefit of priority from prior Japanese patent application No. 2017-197431, filed on Oct. 11, 2017 and Japanese patent application No. 2018-164396, filed on Sep. 3, 2018, the entire contents of which are incorporated herein by reference.

BACKGROUND

The present invention relates to a wireless communication system capable of permitting the start of a driving source of a vehicle or enabling the running of a vehicle when an authentication code acquired by an in-vehicle unit is a regular authentication code.

A wireless communication system (so-called passive keyless entry device) which includes: a portable device carried by an occupant and capable of transmitting a vehicle-specific authentication code by radio waves; and an in-vehicle unit capable of receiving the transmitted authentication code has been widespread. In this wireless communication system, only when the authentication code wirelessly transmitted from the portable device is a regular authentication code, the release of various locks of a vehicle and the start of a driving source are permitted. Such wireless communication system can be configured as follows. When an access button disposed in the in-vehicle unit is pressed, an access signal is wirelessly transmitted at a low frequency, and the portable device that has received the access signal wirelessly transmits an authentication code at a high frequency. Further, when the authentication code is received by the in-vehicle unit, it can be determined whether or not the authentication code is a regular authentication code.

By the way, in the wireless communication system as described above, there is a problem that effective countermeasures cannot be taken for the acts such as so-called relay attack in which a third party illegally conducts the communication between the portable device and the in-vehicle unit by a relay. That is, since a third party can easily demodulate the modulated signal in the communication between the portable device and the in-vehicle unit, a third party can illegally transmit a regular authentication code from the portable device to the in-vehicle unit by using a relay or the like, thereby releasing various locks of a vehicle and starting a driving source of a vehicle.

Various countermeasures have been proposed in order to prevent the illegal acts such as relay attack as described above. For example, a countermeasure to measure the time until a low-frequency signal is received by the portable device, a countermeasure to change the frequency of a high-frequency signal, or a countermeasure to change the strength of the radio wave to be transmitted, or the like may be taken. Further, as a related art, for example, as disclosed in JP-A-2016-220088, it has also been proposed to prevent the illegal acts such as relay attack by using a portable device capable of modulating an authentication code by a plurality of modulation schemes.

However, in the related-art wireless communication system, the processing configuration of the signal communicated between the in-vehicle unit and the portable device becomes extremely complicated, and hence, a long time may be required for the authentication processing of an occupant having a legitimate portable device or the accuracy of the authentication processing may be deteriorated. Thus, there is a problem that the related-art wireless communication system is insufficient to more reliably prevent illegal acts such as so-called relay attack.

The present invention aims to provide a wireless communication system capable of improving the security effect while avoiding the complication of signal processing.

SUMMARY

According to an aspect of the invention, there is provided a wireless communication system comprising: an in-vehicle unit mounted on a vehicle and comprising an operation unit that can be arbitrarily operated by an occupant, the in-vehicle unit capable of wirelessly transmitting an access signal when the operation unit is operated; a portable device, which can be carried by the occupant, capable of wirelessly transmitting a vehicle-specific authentication code on a condition that the access signal is received; and a determination unit capable of determining whether or not the authentication code is a regular authentication code on a condition that the authentication code is received, wherein start of a driving source of the vehicle is permitted or running of the vehicle is enabled when the determination unit determines that the authentication code is the regular authentication code, and wherein a security mode in which a function of transmitting the access signal by the in-vehicle unit or a function of transmitting the authentication code by the portable device is stopped can be set by a predetermined setting operation.

DETAILED DESCRIPTION OF EXEMPLARY EMBODIMENTS

Hereinafter, embodiments of the present invention will be specifically described with reference to the drawings.

Figure 1:
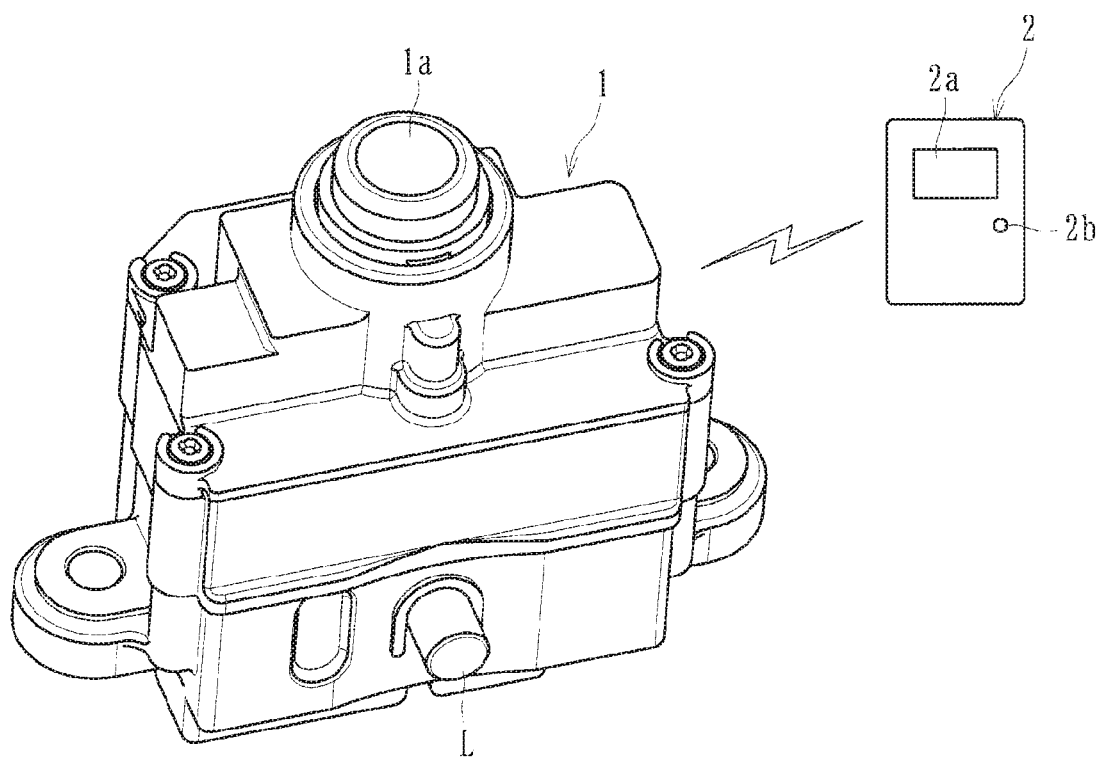
FIG. 1 is a conceptual diagram showing a wireless communication system according to a first embodiment of the present invention (common with a second embodiment)
Figure 2:
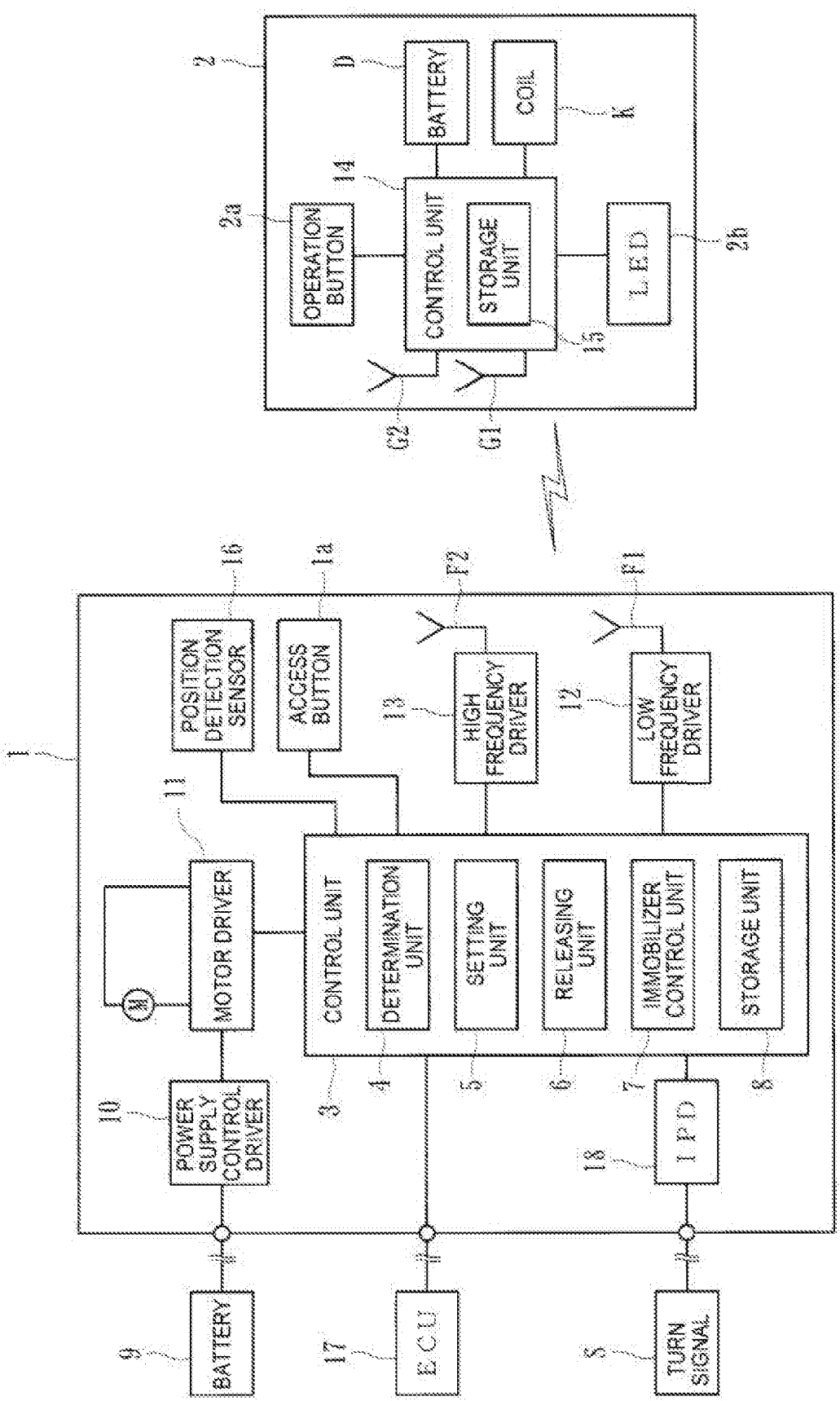
FIG. 2 is a block diagram showing the wireless communication system.

As shown in FIGS. 1 and 2, a wireless communication system according to a first embodiment is configured by a so-called passive keyless entry device which can perform wireless communication between a portable device 2 (electronic key) carried by an occupant and an in-vehicle unit 1 mounted on a vehicle such as a motorcycle and which can permit the start of an engine that is a driving source of a vehicle or enable the running of the vehicle when an authentication code acquired by the in-vehicle unit 1 is a regular authentication code.

The portable device 2 can be carried by an occupant and can wirelessly transmit a vehicle-specific authentication code on the condition that it receives an access signal from the in-vehicle unit 1. As shown in FIG. 2, the portable device 2 includes an operation button 2a (operation unit), an LED 2b as a notification unit, a low-frequency antenna G1 capable of wirelessly receiving an access signal (low-frequency signal) from the in-vehicle unit 1, a high-frequency antenna G2 capable of wirelessly transmitting authentication code (high-frequency signal) to the in-vehicle unit 1, a control unit 14 electrically connected to the low-frequency antenna G1 and the high-frequency antenna G2, a battery D, and a coil K.

A storage unit 15 capable of storing a vehicle-specific authentication code is formed in the control unit 14. The control unit 14 can be operated by receiving electric power from the battery D or the coil K when the immobilizer function is activated. On the condition that the access signal from the in-vehicle unit 1 is received by the low-frequency antenna G1, the control unit 14 is adapted to wirelessly transmit the vehicle-specific authentication code by the high-frequency antenna G2.

The in-vehicle unit 1 is mounted on a vehicle (in the present embodiment, a vehicle body of a motorcycle). As shown in FIG. 1, the in-vehicle unit 1 has an access button 1a (operation unit) and a lock bar L which can be arbitrarily operated by an occupant such as a driver. The in-vehicle unit 1 can wirelessly transmit the access signal to the portable device 2 when the access button 1a is operated. As shown in FIG. 2, in addition to the access button 1a and the lock bar L, the in-vehicle unit 1 includes a control unit 3, a motor M capable of driving the lock bar L (see FIG. 1), a low-frequency antenna F1, and a high-frequency antenna F2.

The motor M is electrically connected to a battery 9 mounted on a vehicle via a power supply control driver 10. The motor M can be controlled by a motor driver 11 and move the lock bar L. The lock bar L is movable between a lock position where it is inserted into a lock hole (not shown) formed in a handle bar of a vehicle to lock the handle bar and an unlock position where it is retracted from the lock hole to release of the lock the handle bar.

Specifically, when the lock bar L is in the lock position, the handle bar is locked and the vehicle cannot be driven. When the lock bar L is in the unlock position, the lock of the handle bar is released and the vehicle can drive. Further, the position of the lock bar L can be detected by a position detection sensor 16. The position (the lock position or the unlock position) of the lock bar L detected by the position detection sensor 16 can be transmitted to the control unit 3.

The control unit 3 is electrically connected to the low-frequency antenna F1 via a low-frequency driver 12 and is electrically connected to the high-frequency antenna F2 via a high-frequency driver 13. The control unit 3 can perform the control based on the transmission of a low-frequency signal by the low-frequency antenna F1 and the reception of a high-frequency signal by the high-frequency antenna F2. Further, the control unit 3 is electrically connected to the access button 1a (operation unit) and is electrically connected to an ECU (Engine Control Unit) 17 mounted on the vehicle and right and left turn signals S (direction indicator lamps) via an IPD (intelligent Power Device) 18 or the like.

Furthermore, on the condition that the access button 1a is pressed, the control unit 3 according to the present embodiment can wirelessly transmit an access signal including a low-frequency signal from the low-frequency antenna F1 to the portable device 2. On the condition that an authentication code including a high-frequency signal wirelessly transmitted from the portable device 2 is received by the high-frequency antenna F2, the control unit 3 can determine whether or not the received authentication code is a regular authentication code. The control unit 3 includes a determination unit 4 capable of determining an authentication code, a setting unit 5 capable of setting a security mode, a release unit 6 capable of releasing the security mode, an immobilizer control unit 7 capable of activating the immobilizer function, and a storage unit 8 capable of storing a random number code or the like.

The determination unit 4 is formed in the control unit 3 disposed in the in-vehicle unit 1. On the condition that the authentication code transmitted from the portable device 2 is received by the high-frequency antenna F2, the determination unit 4 can determine whether or not the authentication code is a regular authentication code. Then, when it is determined that the authentication code received by the determination unit 4 is a regular authentication code, under the control of the control unit 3, the motor M is driven to move the lock bar L to the unlock position when the lock bar L is in the lock position. Further, under the control of the control unit 3, a permission signal is transmitted to the ECU 17 and the start of an engine (driving source) is permitted (e.g., the operation of a starter is permitted). On the other hand, when it is determined that the authentication code received by the determination unit 4 is not a regular authentication code, the motor M is not driven and the permission signal is not transmitted to the ECU 17.

Here, the wireless communication system according to the present embodiment can set a security mode in which at least the function of transmitting the access signal by the in-vehicle unit 1 is stopped by a predetermined setting operation. Specifically, when a specific operation (e.g., "long press operation" or "continuous press operation" or the like different from normal operation) is performed on the access button 1a (operation unit) provided in the in-vehicle unit 1, the security mode is set by the setting unit 5, and at least the function of transmitting the access signal by the in-vehicle unit 1 is stopped. In this manner, when the security mode is set, the access signal (low-frequency signal) is not transmitted from the low-frequency antenna F1 of the in-vehicle unit 1 even when the access button 1a is pressed. Therefore, the access signal is not received by the low-frequency antenna G1 of the portable device 2.

In the security mode, it is sufficient to stop at least the function of transmitting the access signal by the in-vehicle unit 1. In the security mode, in addition to stopping the function of transmitting the access signal by the in-vehicle unit 1, the function of transmitting the authentication code by the portable device 2 may be stopped (i.e., both the function of transmitting the access signal by the in-vehicle unit and the function of transmitting the authentication code by the portable device may be stopped). Further, the predetermined operation for setting the security mode is not limited to the specific operation on the access button (operation unit) of the in-vehicle unit 1 as in the present embodiment. For example, a specific operation (e.g., "long press operation" or "continuous press operation" or the like different from normal operation) on the operation button 2a (operation unit) provided in the portable device 2 may be performed.

The release unit 6 can release the security mode by performing a predetermined release operation on the operation button 2a (operation unit) provided in the portable device 2. Further, as the security mode is released, the function of transmitting the access signal by the in-vehicle unit 1 (in the present embodiment, in addition to the function of transmitting the access signal, the function of transmitting the authentication code by the portable device 2) is restored. In this way, the in-vehicle unit 1 can transmit the access signal and the portable device 2 can transmit the authentication code.

Further, the predetermined operation for releasing the security mode is not limited to the specific operation on the operation button 2a (operation unit) of the portable device 2 as in the present embodiment. For example, a specific operation (e.g., "long press operation" or "continuous press operation" or the like different from normal operation) may be performed on the access button 1a (operation unit) of the in-vehicle unit 1 or an operation may be performed on an operation unit (preferably, an operation unit disposed at a hidden position which is difficult to see by a third part) provided separately on the in-vehicle unit 1 or the vehicle.

Furthermore, in the present embodiment, when the security mode is set, random number codes are generated by the control unit 3 and stored in the storage unit 8 of the in-vehicle unit 1 and the storage unit 15 of the portable device 2, respectively. When the release operation is performed, the random number code stored in the storage unit 15 of the portable device 2 is compared with the random number code stored in the storage unit 8 of the in-vehicle unit 1. Only when these random number codes are match, the security mode is released.

The immobilizer control unit 7 is provided for enabling the immobilizer function, for example, on the condition that a predetermined operation (a specific operation different from the operation at the time of transmitting the access signal or the operation at the time of setting the security mode) is performed on the access button 1a of the in-vehicle unit 1. That is, for example, when the battery D of the portable device 2 is exhausted and the supply of electric power becomes impossible, a specific operation is performed on the access button 1a in a state where the portable device 2 is brought close to the in-vehicle unit 1. Then, the immobilizer control unit 7 is operated and a low frequency wave is transmitted to the portable device 2 to cause the portable device 2 to generate electric power in the coil K. The authentication code can be wirelessly transmitted with the generated electric power.

Further, in the portable device 2 according to the present embodiment, the LED 2b as a notification unit is attached. The LED 2b can be turned on or blinked in a state where the security mode is set. Thereby, it is possible to notify that the security mode is set by the turning on or blinking of the LED 2b. In this manner, in addition to notifying the presence or absence of the setting of the security mode, the LED 2b (notification unit) may be configured to notify the occurrence of an error (including an error at the time of generating a random number or the like, an error at the time of communication between the in-vehicle unit 1 and the portable device 2, etc.). Meanwhile, such notification unit is not limited to the LED 2b provided in the portable device 2. For example, another display unit provided in the portable device 2, a display unit such as an LED provided in the in-vehicle unit 1, or a display unit (e.g., a meter panel or a separate liquid crystal display panel, etc.) attached to the vehicle may be adopted.

Figure 3:
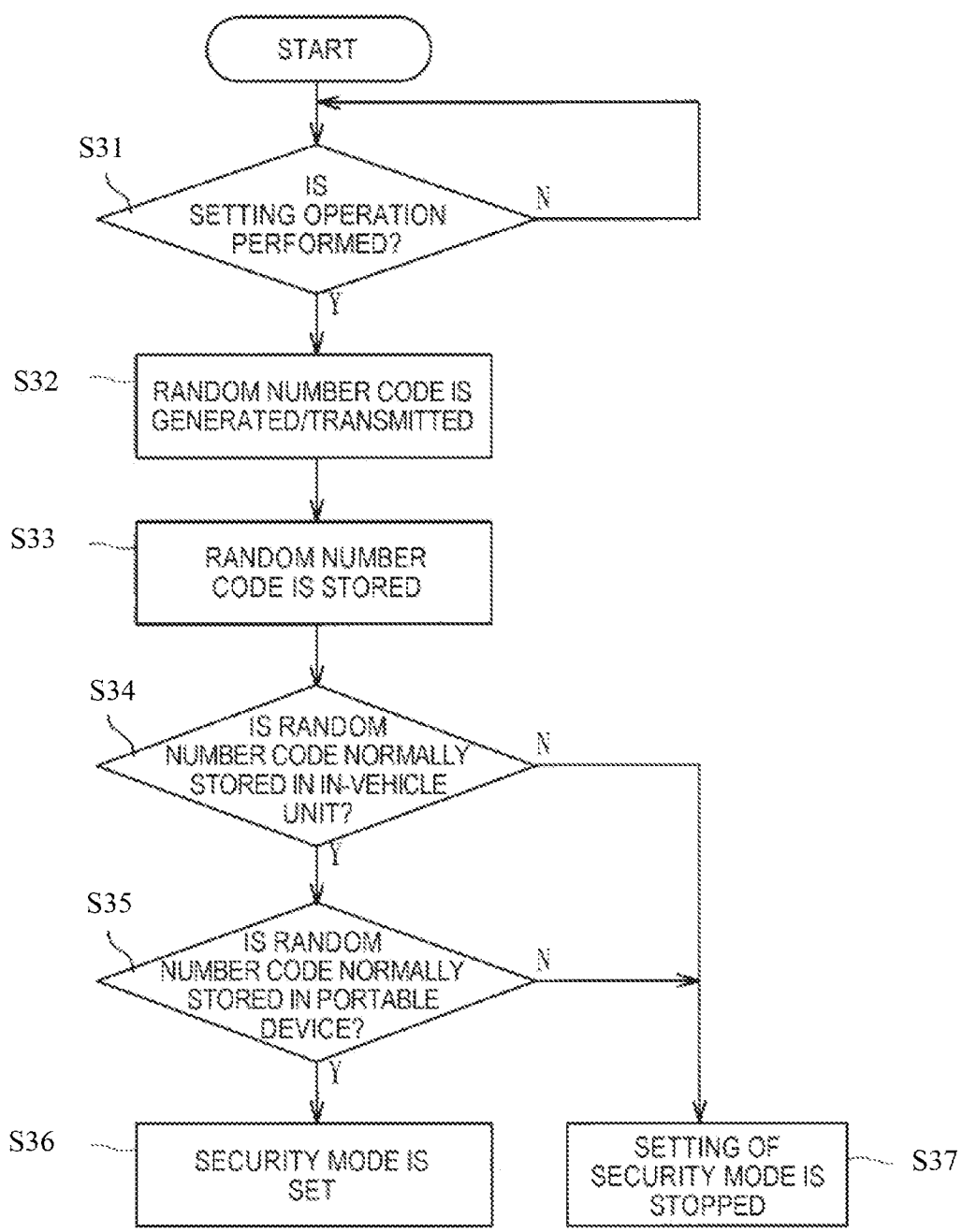
FIG. 3 is a flowchart showing the control at the time of setting a security mode in the wireless communication system.

Subsequently, the control content at the time of setting the security mode in the wireless communication system according to the present embodiment will be described with reference to the flowchart of FIG. 3.

First, in S31, it is determined whether or not a predetermined setting operation (in the present embodiment, a specific operation on the access button 1a) for setting the security mode is performed. When it is determined that the predetermined setting operation is performed, the process proceeds to S2. In S32, a random number code is generated by the control unit 3 and is wirelessly transmitted to the portable device 2 by the low-frequency antenna F1.

Then, in S33, the random number code is stored in the storage unit 8 of the in-vehicle unit 1 and the storage unit 15 of the portable device 2, respectively. Then, in S34, it is determined whether or not the random number code is normally stored in the storage unit 8 of the in-vehicle unit 1. In S35, it is determined whether or not the random number code is normally stored in the storage unit 15 of the portable device 2. When it is determined in either S34 or S35 that the random number code is not normally stored, the setting of the security mode is stopped in S37. When it is determined in both S34 and S35 that the random number code is normally stored, the process proceeds to S36. In S36, the security mode is set by the setting unit 5.

Subsequently, the control content at the time of authenticating the authentication code in the wireless communication system according to the present embodiment will be described with reference to the flowchart of FIG. 4.

First, in S41, it is determined whether or not an operation (one pressing operation) is performed on the access button 1a. When it is determined that the operation is performed, the process proceeds to S42. In S42, it is determined whether or not the security mode is set. When it is determined in S42 that the security mode is not set, the process proceeds to S43. In S43, the access signal is wirelessly transmitted by the low-frequency antenna F1. Then, in S44, the authentication code from the portable device 2 is received by the high-frequency antenna F2.

Then, in S45, the determination unit 4 determines whether or not the authentication code from the portable device 2 is a regular authentication code. When it is determined that the authentication code is a regular authentication code, the process proceeds to S46. In S46, the permission signal is transmitted to the ECU 17 and the start of the engine (driving source) is permitted. Further, in the present embodiment, in S46, in addition to transmitting the permission signal to the ECU 17, the motor M is driven to move the lock bar L to the unlock position when the lock bar L is in the lock position. In this manner, the vehicle is allowed to run.

On the other hand, when it is determined in S42 that the security mode is set, S43 to S46 after S42 are skipped. Therefore, the function of transmitting the access signal from the in-vehicle unit 1 is stopped. Further, when it is determined in S45 that the authentication code from the portable device 2 is not a regular authentication code, S46 is skipped. Therefore, the engine (driving source) cannot be started and the lock by the lock bar L is not released.

Figure 5:
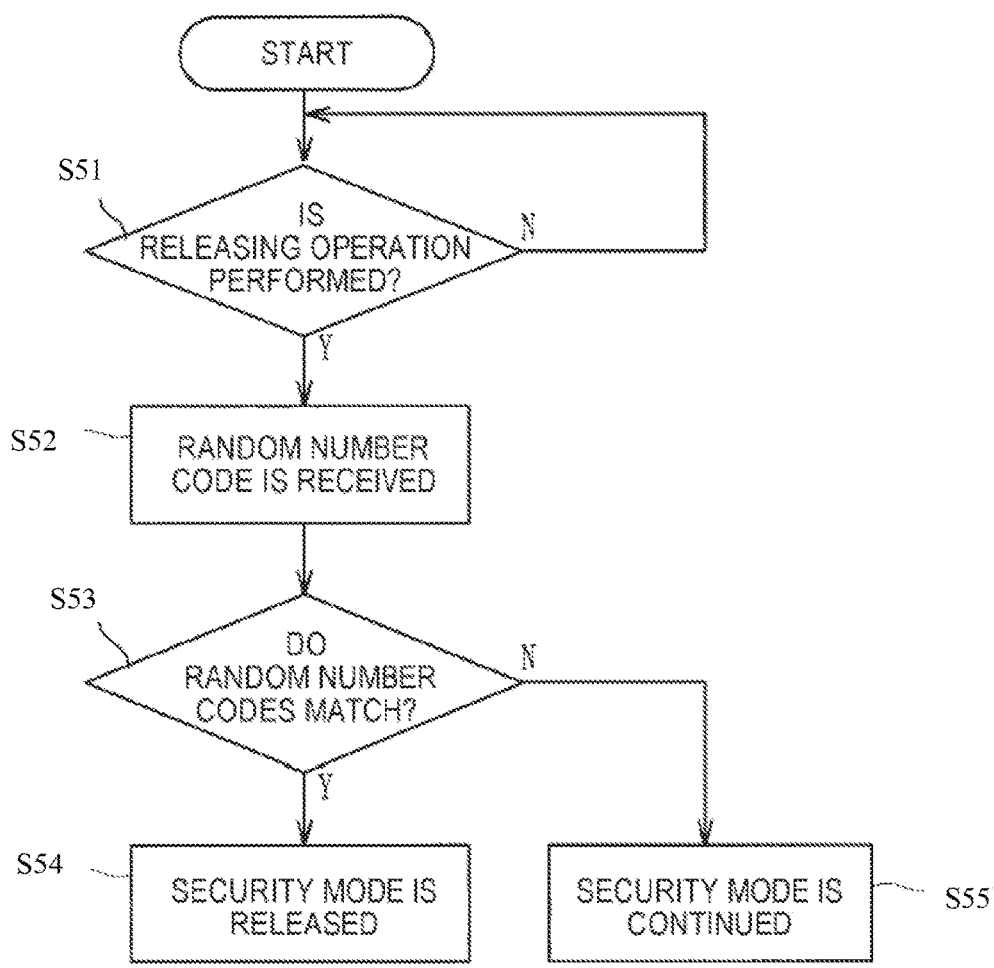
FIG. 5 is a flowchart showing the control at the time of releasing the security mode in the wireless communication system.

Subsequently, the control content at the time of releasing the security mode in the wireless communication system according to the present embodiment will be described with reference to the flowchart of FIG. 5.

First, in S51, it is determined whether or not a pressing operation (a predetermined releasing operation) on the operation button 2a provided in the portable device 2 is performed. When it is determined that the operation is performed, the process proceeds to S52. In S52, the random number code stored in the portable device 2 is received. That is, when the operation button 2a of the portable device 2 is operated, the random number code stored in the storage unit 15 of the portable device 2 can be wirelessly transmitted by the high-frequency antenna G52 and can be received by the high-frequency antenna F2 of the in-vehicle unit 1.

Then, in S53, the control unit 3 compares the random number code stored in the storage unit 8 of the in-vehicle unit 1 with the random number code transmitted from the portable device 2, and it is determined whether or not these random number codes match. Then, when it is determined from the results of the comparison of the random number codes that the random number codes match, the process proceeds to S54. In S54, the security mode is released by the release unit 6. When it is determined that the random number codes do not match, the process proceeds to S55. In S55, the security mode is not released by the release unit 6 and the setting of the security mode is continued.

However, when the normal operation (one pressing operation) is performed on the access button 1a of the in-vehicle unit 1 after the security mode is released, the access signal may be transmitted from the low-frequency antenna F1 of the in-vehicle unit 1 and the authentication code from the portable device 2 may be determined by the determination unit 4. Alternatively, when the security mode is released, the access signal may be automatically transmitted from the low-frequency antenna F1 of the in-vehicle unit 1 and the authentication code from the portable device 2 may be determined by the determination unit 4.

In this manner, when the operation on the access button 1a is required after the security mode is released, the security effect can be enhanced. When the authentication code is automatically determined, the operability can be improved. Further, it is preferable to arbitrarily select the control in which the operation on the access button 1a is required after the security mode is released and the control in which the authentication code is automatically determined.

Next, a wireless communication system according to a second embodiment of the present invention will be described.

Figure 6:
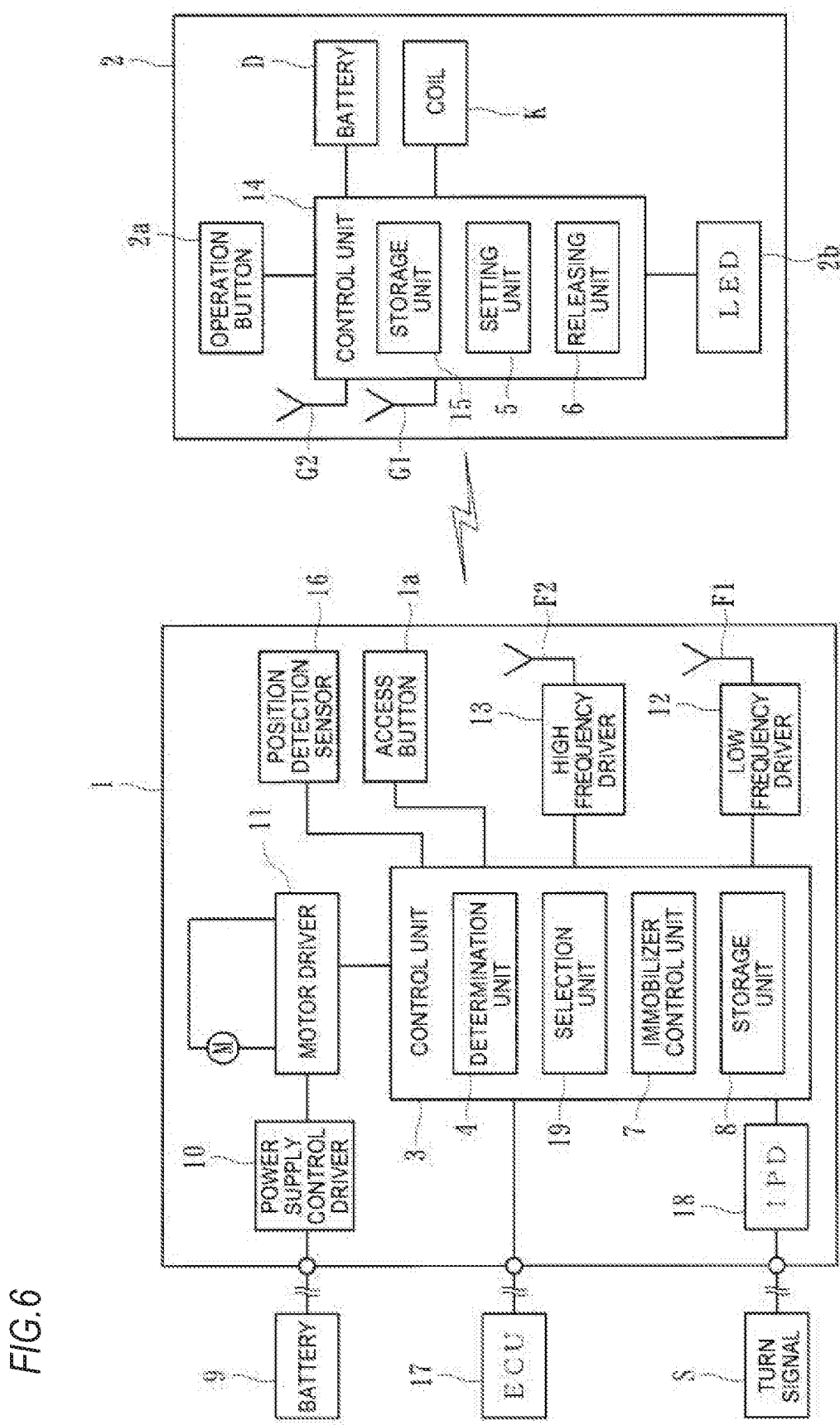
FIG. 6 is a block diagram showing a wireless communication system according to the second embodiment of the present invention.

Similar to the first embodiment, as shown in FIGS. 1 and 6, the wireless communication system according to the second embodiment is configured by a so-called passive keyless entry device which can perform wireless communication between the portable device 2 (electronic key) carried by an occupant and the in-vehicle unit 1 mounted on a vehicle such as a motorcycle and which can permit the start of an engine that is a driving source of a vehicle or enable the running of the vehicle when an authentication code acquired by the in-vehicle unit 1 is a regular authentication code. Meanwhile, the same components as those of the first embodiment are denoted by the same reference numerals, and detailed description thereof will be omitted.

In the wireless communication system according to the present embodiment, the setting unit 5 and the release unit 6 in the first embodiment are formed in the control unit 14 of the portable device 2 (electronic key). Here, the wireless communication system according to the present embodiment can set a security mode in which at least the function of transmitting the authentication code by the portable device 2 is stopped by a predetermined setting operation. Specifically, when a specific operation (e.g., "long press operation" or "continuous press operation" or the like different from normal operation) is performed on the operation button 2a (operation unit) provided in the portable device 2, the security mode is set by the setting unit 5, and at least the function of transmitting the authentication code by the portable device 2 is stopped. In this manner, when the security mode is set, the authentication code (high-frequency signal) is not transmitted from the high-frequency antenna G2 of the portable device 2 even when the access button 1a is pressed so that the access signal is transmitted from the low-frequency antenna F1 of the in-vehicle unit 1 and received by the low-frequency antenna G1 of the portable device 2.

In the security mode, it is sufficient to stop at least the function of transmitting the authentication code by the portable device 2. In the security mode, in addition to stopping the function of transmitting the authentication code by the portable device 2, the function of transmitting the access signal by the in-vehicle unit 1 may be stopped (i.e., both the function of transmitting the access signal by the in-vehicle unit and the function of transmitting the authentication code by the portable device may be stopped). Further, the predetermined operation for setting the security mode is not limited to the specific operation on the operation button 2a (operation unit) of the portable device 2 as in the present embodiment. For example, a specific operation (e.g., "long press operation" or "continuous press operation" or the like different from normal operation) on the access button (operation unit) provided in the in-vehicle unit 1 may be performed.

The release unit 6 can release the security mode by performing a predetermined release operation on the operation button 2a (operation unit) provided in the portable device 2. Further, as the security mode is released, the function of transmitting the authentication code by the portable device 2 (in the present embodiment, in addition to the function of transmitting the authentication code, the function of transmitting the access signal by the in-vehicle unit 1) is restored. In this way, the in-vehicle unit 1 can transmit the access signal and the portable device 2 can transmit the authentication code.

Further, the predetermined operation for releasing the security mode is not limited to the specific operation on the operation button 2a (operation unit) of the portable device 2 as in the present embodiment. For example, a specific operation (e.g., "long press operation" or "continuous press operation" or the like different from normal operation) may be performed on the access button 1a (operation unit) of the in-vehicle unit 1 or an operation may be performed on an operation unit (preferably, an operation unit disposed at a hidden position which is difficult to see by a third part) provided separately on the in-vehicle unit 1 or the vehicle.

Furthermore, as in the first embodiment, when the security mode is set, random number codes may be generated by the control unit 3 and stored in the storage unit 8 of the in-vehicle unit 1 and the storage unit 15 of the portable device 2, respectively. When the release operation is performed, the random number code stored in the storage unit 15 of the portable device 2 may be compared with the random number code stored in the storage unit 8 of the in-vehicle unit 1. Only when these random number codes are match, the security mode may be released.

Further, in the portable device 2 according to the present embodiment, the LED 2b as a notification unit is attached. The LED 2b can be turned on or blinked in a state where the security mode is set. Thereby, it is possible to notify that the security mode is set by the turning on or blinking of the LED 2b. In this manner, in addition to notifying the presence or absence of the setting of the security mode, the LED 2b (notification unit) may be configured to notify the occurrence of an error. Meanwhile, such notification unit is not limited to the LED 2*b* provided in the portable device 2. For example, another display unit provided in the portable device 2, a display unit such as an LED provided in the in-vehicle unit 1, or a display unit (e.g., a meter panel or a separate liquid crystal display panel, etc.) attached to the vehicle may be adopted.

Here, in the present embodiment, a selection unit 19 capable of enabling or disabling a predetermined setting operation for setting the security mode in advance is disposed. Such selection unit 19 is configured by an operation switch or the like provided in the in-vehicle unit 1, the portable device 2 or the vehicle, for example. By operating the operation switch or the like in advance by a user, the enable or disable of the predetermined setting operation for setting the security mode can be set in advance.

Figure 7:
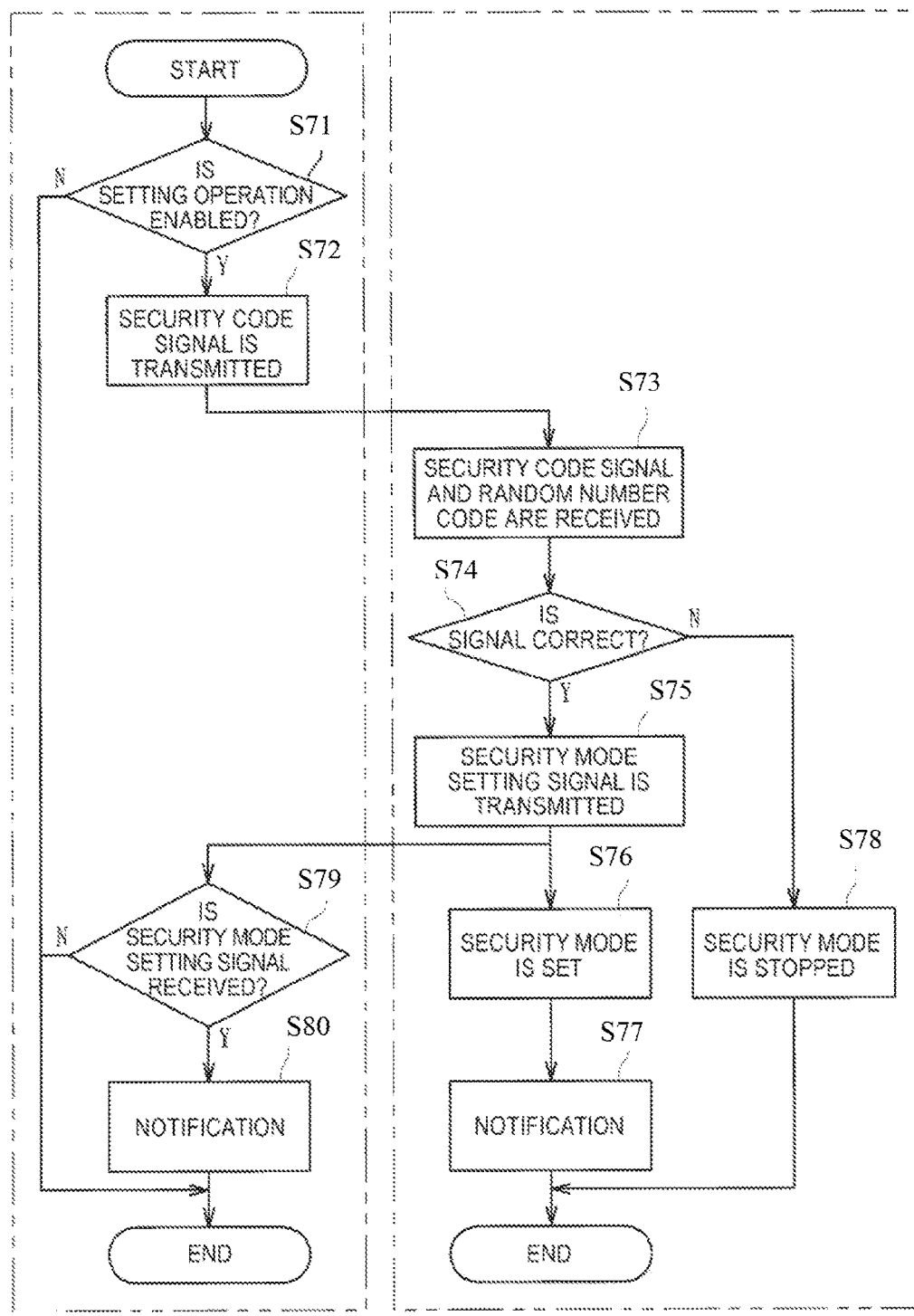
FIG. 7 is a flowchart showing the control at the time of setting the security mode in the wireless communication system.

Subsequently, the control content at the time of setting the security mode in the wireless communication system according to the present embodiment will be described with reference to the flowchart of FIG. 7.

When a predetermined setting operation (in the present embodiment, a specific operation on the operation button 2*a* (operation unit) of the portable device 2) for setting the security mode is performed, it is determined, on the side of the in-vehicle unit 1, whether or not the setting operation is made enabled by the selection unit 19 (S71). When it is determined that the setting operation is enabled, the process proceeds to S72. In S72, a security code signal is wirelessly transmitted to the portable device 2 by the low-frequency antenna F1.

Then, on the side of the portable device 2, when the security code signal is received by the low-frequency antenna G1 of the portable device 2 (S73), it is determined whether or not the received security code signal is correct (S74). When it is determined that the received security code signal is correct, the process proceeds to S75. In S75, a security mode setting signal is transmitted by the high-frequency antenna G2 of the portable device 2. Then, the process proceeds to S76. In S6, the security mode is set by the setting unit 5. The process proceeds to S77. In S77, the notification that the security mode is set is performed by the LED 2*b* disposed in the portable device 2 or a separate display unit or the like. Meanwhile, when it is determined in S4 that the security code signal is not correct, the process proceeds to S78. In S8, the setting of the security mode is stopped.

On the other hand, when the security mode setting signal is transmitted in S75, it is determined, on the side of the in-vehicle unit 1, whether or not the security mode setting signal is received (S79). When the security mode setting signal is correctly received, the process proceeds to S80. In S80, the notification that the security mode is set is performed by an LED disposed in the in-vehicle unit 1 or a separate display unit or the like. Meanwhile, when it is determined in S71 that the setting operation is disabled by the selection unit 19, S2, S79 and S80 are skipped. In addition, when it is determined in S79 that the security mode setting signal is not correctly received, S80 is skipped.

Figure 8:
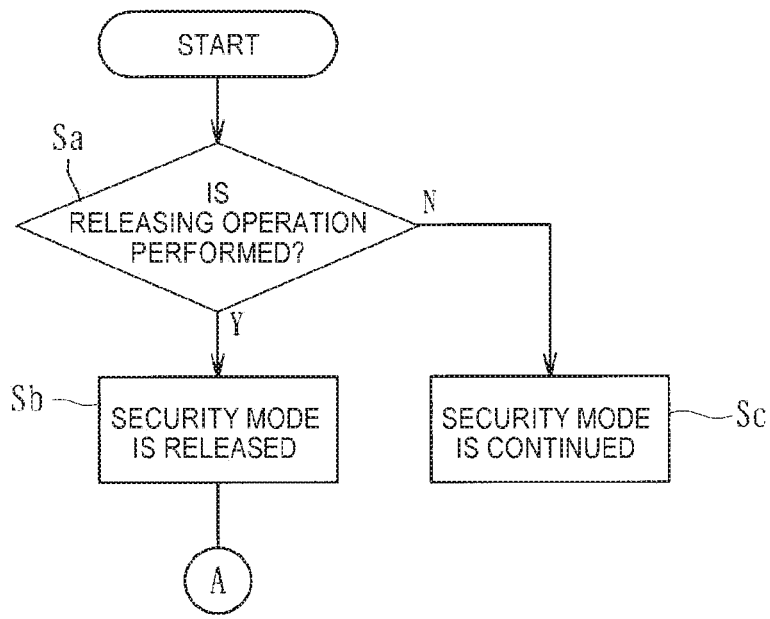
FIG. 8 is a flowchart showing the control at the time of releasing the security mode in the wireless communication system.

Subsequently, the control content at the time of releasing the security mode in the wireless communication system according to the present embodiment will be described with reference to the flowchart of FIGS. 8 and 4.

When a pressing operation (a predetermined releasing operation) is performed on the operation button 2*a* provided in the portable device 2, it is determined in Sa whether or not the releasing operation is performed. When it is determined that the releasing operation is performed, the process proceeds to Sb. In Sb, the security mode is released by the release unit 6. When it is determined that the releasing operation is not performed, the process proceeds to Sc. In Sc, the security mode is continues. Then, when an operation is performed on the access button 1*a* after the security mode is released in Sb, a control A similar to that in the first embodiment is performed.

Figure 4:
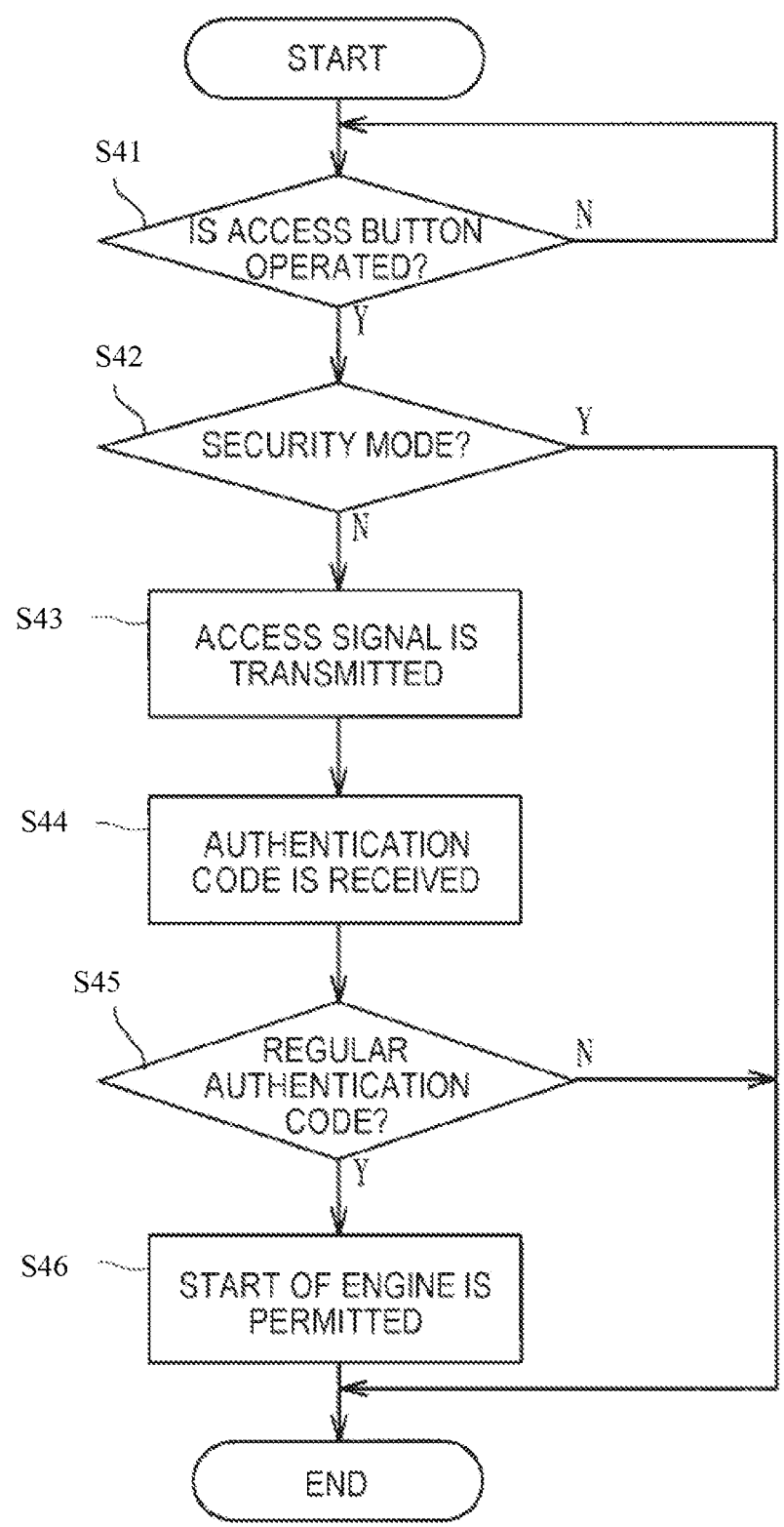
FIG. 4 is a flowchart showing the control at the time of authenticating an authentication code in the wireless communication system (common with the second embodiment)

Specifically, as shown in the flowchart of FIG. 4, in the control A, it is determined in S41 whether or not an operation (one pressing operation) is performed on the access button 1*a*. When it is determined that the operation is performed, the process proceeds to S42. In S42, it is determined whether or not the security mode is set. When it is determined in S42 that the security mode is not set, the process proceeds to S43. In S43, the access signal is wirelessly transmitted by the low-frequency antenna F1. Then, in S44, the authentication code from the portable device 2 is received by the high-frequency antenna F2.

Then, in S45, the determination unit 4 determines whether or not the authentication code from the portable device 2 is a regular authentication code. When it is determined that the authentication code is a regular authentication code, the process proceeds to S46. In S46, the permission signal is transmitted to the ECU 17 and the start of the engine (driving source) is permitted. Further, in the present embodiment, in S46, in addition to transmitting the permission signal to the ECU 17, the motor M is driven to move the lock bar L to the unlock position when the lock bar L is in the lock position. In this manner, the vehicle is allowed to run.

On the other hand, when it is determined in S42 that the security mode is set, S43 to S46 after S42 are skipped. Therefore, the function of transmitting the access signal from the in-vehicle unit 1 is stopped. Further, when it is determined in S45 that the authentication code from the portable device 2 is not a regular authentication code, S46 is skipped. Therefore, the engine (driving source) cannot be started and the lock by the lock bar L is not released.

According to the first and second embodiments, the security mode in which the function of transmitting the access signal (first embodiment) by the in-vehicle unit 1 or the function of transmitting the authentication code (second embodiment) by the portable device 2 is stopped can be set by a predetermined setting operation. In this way, illegal acts such as so-called relay attack can be reliably prevented just by stopping the transmission function. Further, it is possible to improve the security effect while avoiding the complication of signal processing. Further, when both the function of transmitting the access signal by the in-vehicle unit 1 and the function of transmitting the authentication code by the portable device 2 are stopped in the security mode, both the function of transmitting the access signal and the function of transmitting the authentication code are stopped, and the security effect can be further improved.

Furthermore, since a predetermined setting operation for setting the security mode is configured by a specific operation on the access button 1*a* (operation unit) provided in the in-vehicle unit 1, it is not necessary to provide a separate new operation unit for setting the security mode, and it is possible to suppress an increase in production cost. Further, since the security mode can be set without taking out the portable device 2, the operability can be improved. Further, when the predetermined setting operation for setting the security mode is configured by a specific operation on the operation button 2*a* (operation unit) provided in the portable device 2, the setting operation can be performed from a remote position and the operability can be further improved.

Moreover, the security mode can be released when a predetermined releasing operation is performed on the operation button 2a (operation unit) provided in the portable device 2. Therefore, as compared with the case where the releasing operation is performed on the access button 1a of the in-vehicle unit 1, it is possible to reliably prevent a third party from performing a releasing operation, and thus, the security effect can be further improved. Further, when the security mode can be released by performing a predetermined releasing operation on the access button 1a (operation unit) provided in the in-vehicle unit 1, it is not necessary to provide a separate new operation unit for releasing the security mode, and it is possible to suppress an increase in production cost. Further, since the security mode can be released without taking out the portable device 2, the operability can be improved.

In addition, according to the present embodiment, when the releasing operation is performed on the operation button 2a (operation unit) of the portable device 2, the security mode can be released and a turn signal S of a vehicle can be blinked. Therefore, the releasing operation can serve as both an operation of releasing the security mode and an operation of blinking the turn signal S of the vehicle to activate the answer callback.

Furthermore, when the security mode is set, random number codes are generated and stored in the storage unit (8, 15) of the in-vehicle unit 1 and the portable device 2, respectively. When the release operation is performed, the random number code stored in the storage unit 15 of the portable device 2 is compared with the random number code stored in the storage unit 8 of the in-vehicle unit 1. Only when these random number codes are match, the security mode is released. Therefore, the security effect can be maintained by comparing the random number codes.

Moreover, since the in-vehicle unit 1 according to the present embodiment has an immobilizer function of transmitting a low frequency wave to the portable device 2 to cause the portable device 2 to generate electric power and wirelessly transmit the authentication code with the generated electric power, it is possible to smoothly deal with an emergency such as the battery exhaustion of the portable device 2. Further, the portable device 2 (which may be the in-vehicle unit 1) includes the LED 2b (notification unit) capable of notifying that the security mode is set. Therefore, when a passenger leaves a vehicle, the passenger can recognize and grasp the setting state of the security mode. Meanwhile, the notification unit may be another display unit provided in the vehicle.

Figure 9:
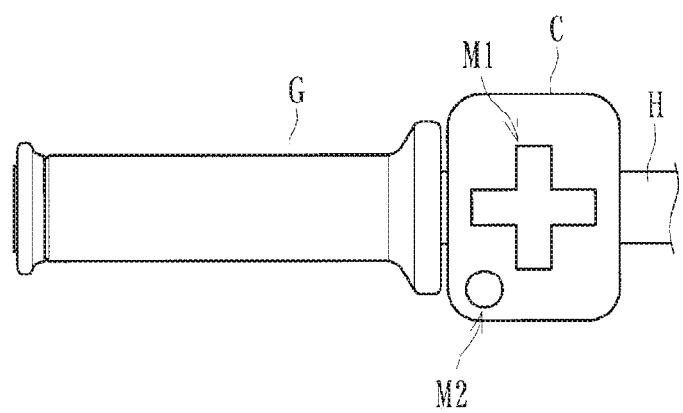
FIG. 9 is a schematic diagram showing a vehicle-side operation unit in a wireless communication system according to another embodiment of the present invention.

Although the present embodiment has been described above, the present invention is not limited thereto. For example, a predetermined setting operation for setting the security mode or a predetermined releasing operation for releasing the security mode may be performed on a vehicle-side operation unit attached to a vehicle. In this case, as shown in FIG. 9, a switch M1 or a switch M2 disposed in a handle switch case C attached to a handle bar H of a vehicle may be used as the vehicle-side operation unit. Meanwhile, the reference numeral G in FIG. 9 indicates a holding grip which can be grasped by a driver.

The switch M1 is configured by a cross key that can be pressed left, right, up and down. For example, the security mode may be set or released by displaying a menu on a display unit (a meter panel or a separate liquid crystal display unit, etc.) provided in a vehicle and selecting and determining the items concerning the security mode from the menu by the switch M1. Further, the switch M2 is configured by an operation button that can be pressed. The security mode may be set or released by pressing such operation button.

In this manner, when a predetermined setting operation for setting the security mode or a predetermined releasing operation for releasing the security mode can be performed on the vehicle-side operation unit attached to the vehicle, the predetermined setting operation for setting the security mode or the predetermined releasing operation for releasing the security mode can be performed at an arbitrary position of the vehicle, and thus, the operability can be improved. In particular, since the vehicle-side operation unit is disposed in the handle switch case C attached to the handle bar H of the vehicle, it is possible to further improve the operability of the predetermined setting operation for setting the security mode or the predetermined releasing operation for releasing the security mode.

In addition, for example, when the determination unit 4 determines that the authentication code is a regular authentication code, only one of the operation of transmitting the permission signal to the ECU 17 to permit the start of the engine (driving source) of the vehicle and the operation of moving the lock bar L to the unlock position to allow the running of the vehicle may be performed, in place of the operation of transmitting the permission signal to the ECU 17 to permit the start of the engine (driving source) of the vehicle and moving the lock bar L to the unlock position to allow the running of the vehicle as in the present embodiment.

Further, when the releasing operation is performed on the operation button 2a of the portable device 2, the answer callback may not be activated or another function may be activated together with the releasing of the security mode, in place of releasing the security mode, blinking the turn signal of the vehicle and activating the answer callback. Furthermore, the immobilizer function may not be provided or the notification unit such as the LED 2b may not be provided. Meanwhile, in the present embodiment, the invention is applied to a motorcycle. However, the invention may be applied to other vehicles such as ATVs, snowmobiles, a construction machines, agricultural machines and automobiles.

The wireless communication system may have another external appearance or may have another additional function, so long as it is possible to set, by a predetermined setting operation, the security mode in which the function of transmitting the access signal by the in-vehicle unit or the function of transmitting the authentication code by the portable device is stopped.

According to an aspect of the invention, there is provided a wireless communication system comprising: an in-vehicle unit mounted on a vehicle and comprising an operation unit that can be arbitrarily operated by an occupant, the in-vehicle unit capable of wirelessly transmitting an access signal when the operation unit is operated; a portable device, which can be carried by the occupant, capable of wirelessly transmitting a vehicle-specific authentication code on a condition that the access signal is received; and a determination unit capable of determining whether or not the authentication code is a regular authentication code on a condition that the authentication code is received, wherein start of a driving source of the vehicle is permitted or running of the vehicle is enabled when the determination unit determines that the authentication code is the regular authentication code, and wherein a security mode in which a function of transmitting the access signal by the in-vehicle unit or a function of transmitting the authentication code by the portable device is stopped can be set by a predetermined setting operation.

According to the aspect of the invention, the security mode in which the function of transmitting the access signal by the in-vehicle unit or the function of transmitting the authentication code by the portable device is stopped can be set by a predetermined setting operation. In this way, illegal acts such as so-called relay attack can be reliably prevented just by stopping the transmission function. Further, it is possible to improve the security effect while avoiding the complication of signal processing.

In the security mode, both the function of transmitting the access signal by the in-vehicle unit and the function of transmitting the authentication code by the portable device may be stopped.

In this case, in the security mode, both the function of transmitting the access signal by the in-vehicle unit and the function of transmitting the authentication code by the portable device are stopped. Therefore, both the function of transmitting the access signal and the function of transmitting the authentication code are stopped, and the security effect can be further improved.

The predetermined setting operation may include a specific operation on the operation unit provided in the in-vehicle unit.

In this case, since the predetermined setting operation is configured by a specific operation on the operation unit provided in the in-vehicle unit, it is not necessary to provide a separate new operation unit for setting the security mode, and it is possible to suppress an increase in production cost. Further, since the security mode can be set without taking out the portable device, the operability can be improved.

The predetermined setting operation may include a specific operation on an operation unit provided in the portable device.

In this case, since the predetermined setting operation is configured by a specific operation on the operation unit provided in the portable device, the setting operation can be performed from a remote position and the operability can be further improved.

The security mode may be released when a specific releasing operation is performed on the operation unit provided in the in-vehicle unit.

In this case, since the security mode can be released when a predetermined releasing operation is performed on the operation unit provided in the in-vehicle unit, it is not necessary to provide a separate new operation unit for releasing the security mode. Therefore, it is possible to suppress an increase in production cost and the operability can be improved.

The security mode may be released when a specific releasing operation is performed on an operation unit provided in the portable device.

In this case, since the security mode can be released when a predetermined releasing operation is performed on the operation unit provided in the portable device, it is possible to reliably prevent a third party from performing a releasing operation, and thus, the security effect can be further improved.

When the releasing operation is performed on the operation unit, the security mode may be released and a turn signal of the vehicle can be blinked.

In this case, when the releasing operation is performed on the operation unit, the security mode can be released and the turn signal of the vehicle can be blinked. Therefore, the releasing operation can serve as both an operation of releasing the security mode and an operation of blinking the turn signal of the vehicle to activate the answer callback.

The predetermined setting operation for setting the security mode or a predetermined releasing operation for releasing the security mode may be performed on a vehicle-side operation unit attached to the vehicle.

In this case, since a predetermined setting operation for setting the security mode or a predetermined releasing operation for releasing the security mode can be performed on the vehicle-side operation unit attached to the vehicle, the predetermined setting operation for setting the security mode or the predetermined releasing operation for releasing the security mode can be performed at an arbitrary position of the vehicle, and thus, the operability can be improved.

The vehicle-side operation unit may be disposed in a handle switch case attached to a handle bar of the vehicle.

In this case, since the vehicle-side operation unit is disposed in the handle switch case attached to the handle bar of the vehicle, it is possible to further improve the operability of the predetermined setting operation for setting the security mode or the predetermined releasing operation for releasing the security mode.

When the security mode is set, random number codes may be generated and stored in a storage unit of the in-vehicle unit and a storage unit of the portable device, respectively, and when the releasing operation is performed, the random number code stored in the storage unit of the portable device may be compared with the random number code stored in the storage unit of the in-vehicle unit, and the security mode may be released only when the random number codes match.

In this case, when the security mode is set, the random number codes are generated and stored in the storage unit of the in-vehicle unit and the storage unit of the portable device, respectively. Further, when the releasing operation is performed, the random number code stored in the storage unit of the portable device is compared with the random number code stored in the storage unit of the in-vehicle unit. Only when these random number codes are match, the security mode is released. Therefore, the security effect can be maintained by comparing the random number codes.

The in-vehicle unit may have an immobilizer function capable of transmitting a low frequency wave to the portable device to cause the portable device to generate electric power and wirelessly transmit the authentication code with the generated electric power.

In this case, the in-vehicle unit has the immobilizer function capable of transmitting a low frequency to the portable device to cause the portable device to generate electric power and wirelessly transmit the authentication code by the generated electric power. Therefore, it is possible to smoothly deal with an emergency such as the battery exhaustion of the portable device.

The wireless communication system may further comprise a notification unit capable of notifying presence or absence of setting of the security mode or occurrence of an error.

In this case, the wireless communication includes the notification unit capable of notifying the presence or absence of the setting of the security mode or the occurrence of an error. Therefore, it is possible to recognize and grasp the setting state of the security mode or the presence or absence of an error.

The predetermined setting operation for setting the security mode may be enabled or disabled in advance.

In this case, the predetermined setting for setting the security mode can be enabled or disabled in advance. Therefore, it is possible to prevent the setting of the security mode due to an erroneous operation by making the predetermined setting operation disabled in advance.

What is claimed is:

1. A wireless communication system comprising:
    an in-vehicle unit mounted on a vehicle, the in-vehicle unit capable of wirelessly transmitting an access signal;
    a portable remote key device, which can be carried by an occupant, capable of wirelessly transmitting a vehicle-specific authentication code on a condition that the access signal is received from the in-vehicle unit;
    a physical input device configured to set or release a security mode, wherein a notification is sent to both the in-vehicle unit and the portable remote key device when the security mode is set; and
    a controller capable of:
        determining whether the security mode is set or not by the physical input device operated by the occupant;
        when the security mode is set in the in-vehicle unit, disabling the portable remote key device to access the in-vehicle unit via the wireless network, or disabling the in-vehicle unit to access the portable remote key device via the wireless network; and
        when the security mode is not set in the in-vehicle unit, enabling the portable remote key device to access the in-vehicle unit via the wireless network,
        wherein the security mode is set by a predetermined setting operation.

2. The wireless communication system according to claim 1, wherein,
    in the security mode, both the function of transmitting the access signal by the in-vehicle unit and the function of transmitting the vehicle-specific authentication code by the portable remote key device are ceased.

3. The wireless communication system according to claim 1, wherein
    the security mode is able to be set from the in-vehicle unit.

4. The wireless communication system according to claim 1, wherein
    the security mode is able to be set from the portable remote key device.

5. The wireless communication system according to claim 1, wherein
    the security mode is able to be released from the in-vehicle unit.

6. The wireless communication system according to claim 5, wherein,
    when the security mode is set, a random number code is generated and stored in a storage unit of the in-vehicle unit and a storage unit of the portable remote key device, respectively, and
    when the releasing operation is performed, the random number code stored in the storage unit of the portable remote key device is compared with the random number code stored in the storage unit of the in-vehicle unit, and the security mode is released only when the random number codes match.

7. The wireless communication system according to claim 1, wherein
    the security mode is able to be released from the portable remote key device.

8. The wireless communication system according to claim 7, wherein,
    when the security mode is released, a turn signal of the vehicle is blinked.

9. The wireless communication system according to claim 1, wherein
    setting the security mode or releasing the security mode is able to be performed in a vehicle-side operation unit attached to the vehicle.

10. The wireless communication system according to claim 9, wherein
    the vehicle-side operation unit is disposed in a handle switch case attached to a handle bar of the vehicle.

11. The wireless communication system according to claim 1, wherein the in-vehicle unit has an immobilizer function capable of transmitting a low frequency wave to the portable remote key device to cause the portable remote key device to generate electric power and wirelessly transmit the vehicle-specific authentication code with the generated electric power.

12. The wireless communication system according to claim 1, further comprising an indicator capable of notifying presence or absence of setting of the security mode or occurrence of an error.

13. The wireless communication system according to claim 1, wherein
    the predetermined setting operation for setting the security mode can be enabled or disabled in advance.

14. The wireless communication system according to claim 1, wherein
    when the vehicle-specific authentication code received by the in-vehicle unit is verified, the portable remote key device is permitted to start a motor of the vehicle.

15. The wireless communication system according to claim 1, wherein
    when the security mode is set, the in-vehicle unit is not allowed to transmit the access signal, or the portable remote key device is not allowed to transmit the vehicle-specific authentication code to the in-vehicle unit.

16. The wireless communication system according to claim 1, wherein the physical input device is a physical button or switch.

17. The wireless communication system according to claim 1, wherein the physical input device is configured to set or release the security mode that disables the portable remote key device to communicate with the in-vehicle unit via the wireless network, or disables the in-vehicle unit to communicate with the portable remote key device via the wireless network.

* * * * *